(12) United States Patent
Mauer et al.

(10) Patent No.: US 11,467,872 B1
(45) Date of Patent: Oct. 11, 2022

(54) RESOURCE CAPACITY MANAGEMENT

(71) Applicant: Amazon Technologies, Inc., Reno, NV (US)

(72) Inventors: Gustav Mauer, Oakton, VA (US); James Michael Braunstein, Seattle, WA (US); Jin Zhang, Bellevue, WA (US); Scott Sikora, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 595 days.

(21) Appl. No.: 16/529,491

(22) Filed: Aug. 1, 2019

(51) Int. Cl.
*G06F 9/46* (2006.01)
*G06F 9/50* (2006.01)
*G06N 5/04* (2006.01)
*G06N 20/00* (2019.01)

(52) U.S. Cl.
CPC .......... *G06F 9/50* (2013.01); *G06N 5/04* (2013.01); *G06N 20/00* (2019.01)

(58) Field of Classification Search
CPC ............. G06F 9/50; G06N 20/00; G06N 5/04
See application file for complete search history.

(56) References Cited

U.S. PATENT DOCUMENTS

| 2017/0019345 A1* | 1/2017 | Yamasaki | G06F 9/5005 |
| 2017/0331762 A1* | 11/2017 | Miyazawa | G06N 20/10 |

* cited by examiner

*Primary Examiner* — Gregory A Kessler
(74) *Attorney, Agent, or Firm* — Hogan Lovells US, LLP

(57) ABSTRACT

Availability of future capacity can be determined for various categories of resources. In some embodiments, logistic regression models are used to obtain binary predictions of availability. In this way, a customer or other entity can obtain a determination as to the availability of a specific number and category or resources, or resource instances, at a future period of time. In some embodiments alternatives may be provided, which may provide improved characteristics or may have a higher likelihood of availability. Such approaches can also be used to monitor current and future capacity demands and enable a provider to better plan appropriate adjustments to the physical resources that provide that capacity.

20 Claims, 11 Drawing Sheets

Capacity Request     *Customer X*

| | |
|---|---|
| Instance Type: | Type 1, Size A, Region A ▽ |
| Quantity: | 1000 |
| Start Date: | 11/15/2030 🗓 |
| Duration: | 10  Days ▽ |

[Submit] [Cancel]

Capacity Request     *Customer X*

| | |
|---|---|
| Instance Type: | Type 1, Size A, Region A |
| Quantity: | 1000 |
| Date Range: | 11/15/2030 – 11/25/2030 |

Sufficient capacity should be available to satisfy your request

[Request] [Modify] [Cancel]

Capacity Request     *Customer X*

[Request]   Sufficient capacity should be available to satisfy your request of:
*1000 Type 1, Size A instances in Region A from 11/15-2030-11/25/3030*

Recommended alternatives

[Request]   This option would save $12,245 in capacity cost:
*1000 Type 1', Size A instances in Region A from 11/15-2030-11/25/3030*

[Request]   This option has a higher likelihood of availability:
*1000 Type 2, Size A instances in Region B from 11/15-2030-11/25/3030*

[More] [Modify] [Cancel]

RESOURCE CAPACITY MANAGEMENT

BACKGROUND

As an increasing number and variety of tasks are being performed electronically, and the complexity of these tasks is increasing, entities continue to turn to resource providers in order to obtain capacity for performing these tasks. The capacity can come in the form of a resource, physical or virtual, that can be at least partially allocated for use by an entity to perform one or more of these tasks, such that the entity does not have to purchase, configure, and maintain the physical machines that provide the capacity. For large entities, this may involve requesting a significant amount of capacity to support a specific task, such as a new product or system launch. For the provider, at least some amount of knowledge and manual intervention is required to determine whether there will be sufficient capacity available to support this request. Due to factors such as the lengthy amount of time needed to provision additional capacity and the cost of the remaining unused excess capacity, delayed or inaccurate determinations may result in there being insufficient capacity to fulfil the request.

BRIEF DESCRIPTION OF THE DRAWINGS

Various embodiments in accordance with the present disclosure will be described with reference to the drawings, in which:

FIGS. 2A, 2B, and 2C illustrate example user interfaces that can be generated in accordance with various embodiments.

DETAILED DESCRIPTION

Figure 1:
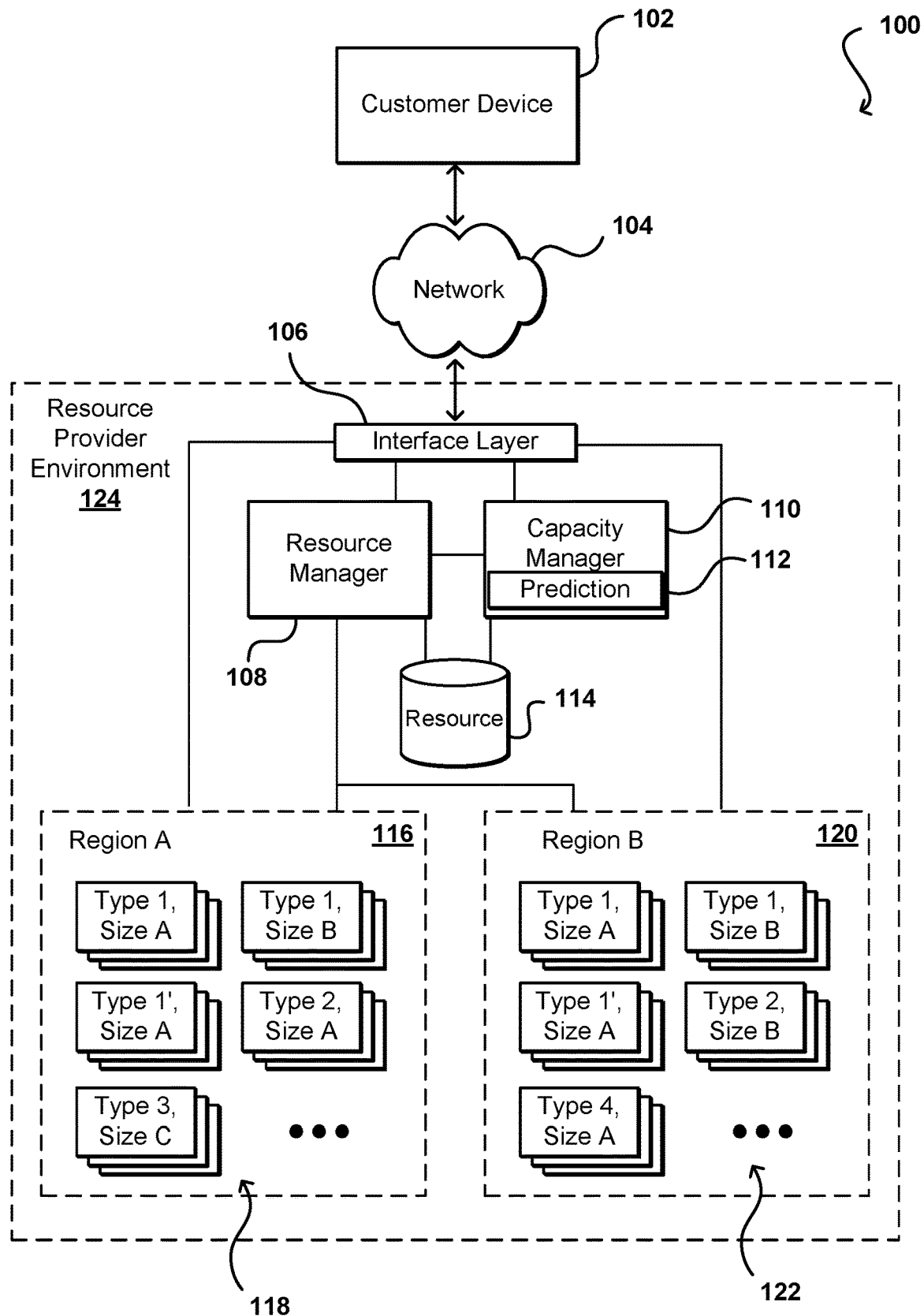
FIG. 1 illustrates components of an example environment in which aspects of various embodiments can be implemented.

Approaches in accordance with various embodiments provide for the management of resource capacity in a computing environment. In particular, various embodiments provide for the forecasting of capacity availability for network-accessible computing resources, for example cloud computing resources. A cloud provider network, or "cloud," refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load.

Customers of a cloud provider network may desire to know in advance of a new product launch or promotion whether the cloud provider will have sufficient resource capacity to support their launch or promotion. For example, a customer might be preparing for a big event such as a new game launch or product promotion, which can require thousands of servers to back the launch or promotion. However, cloud providers typically do not publish information about usage of their resources by their customers or about planned addition of new hardware (and thus new capacity), and so customers do not have access to capacity information for planning their future activities.

The present disclosure addresses the above-described challenges, among others, by providing cloud provider customers with a portal that they can use to specify parameters of a future capacity request (how much capacity is needed, type(s) of needed capacity, the time (e.g., start and duration) the capacity is needed, any placement constraints) and receive information regarding whether their desired capacity is likely to be available at the specified time. In some embodiments, machine learning can be used to estimate available capacity for various categories of capacity based on the parameters input by the customer and on historical information about capacity in the provider network. Some embodiments utilize prediction models, such as may involve logistic regression models or expert systems, in order to obtain binary predictions of availability. In this way, a customer or other entity can obtain a quick determination as to the availability of a specific number and category or resources, or resource instances, at a future period of time. The determination can also be more accurate than manual calculations as it can consider much more data in the analysis. In some embodiments alternatives may be provided, which may provide improved characteristics or may have a higher likelihood of availability. Such approaches can also be used to monitor current and future capacity demands and enable a provider to better plan appropriate adjustments to the physical resources that provide that capacity.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

FIG. 1 illustrates an example computing environment 100 in which aspects of the various embodiments can be implemented. While this example will be discussed with respect to a resource provider and a customer, it should be understood that various other types of users or entities can take advantages of aspects of the various embodiments as well. In this example, a customer might have an account with a resource provider that enables the customer to obtain access to, or usage of, resource capacity under the terms of the account. When the customer wants to obtain use of such capacity, the customer can utilize a customer device 102 to submit a request to an address, interface, or other destination of a resource provider environment 124. The customer device can be any appropriate computing device capable of generating and transmitting such a request, as may include a desktop computer, notebook computer, tablet computer, smartphone, network terminal, and the like. The request can be any appropriate request in any appropriate protocol sent across one or more wired and/or wireless networks 104. The one or more networks can include, for example, the Internet, an Ethernet, a local area network (LAN), a cellular network, or a peer-to-peer network, among other such options.

The request can be received to an interface layer 106 of a resource provider environment 124. The resource can include a number of physical computing and networking devices configurable to provide customer with access to various resources or resource instances. The resource provider environment can be a shared resource or multi-tenant environment in at least some embodiments. The interface layer 106 can include application programming interfaces (APIs) or other exposed interfaces enabling a customer, or other user or device, to submit requests to the resource provider environment 124. The interface layer 106 in this example can include other components as well, such as at least one Web server, routing components, load balancers, and the like. When a request relating to resource capacity is received to the interface layer 106, the interface layer can analyze the request and direct the request to an appropriate system, service, or component in the environment. For requests relating to allocated or reserved resource capacity, the request can be directed to a resource manager 108 that is configured to perform tasks such as to provision and manage existing resources. If the request is for a specific resource, or resource instance, that has already been allocated and is currently able to be used by the customer, then the request in at least some embodiments is able to be directed by the interface layer to the appropriate resource.

A resource in at least some embodiments refers to a physical device, such as a computing device or storage device, or a processing unit, virtual machine, or machine "instance" running on such a physical device. In some embodiments an entire physical device may be allocated to a customer, such as where a customer has bare metal access to an entire computing server. In other embodiments two or more customers might share the capacity of one or more physical devices, or multiple tasks for a given customer might share the capacity of a physical device. In some embodiments, a physical host might run multiple virtual machine instances, where the individual instances can all be allocated to the same customer or can be allocated across two or more customers. Customers may also be able to obtain exclusive or committed access to capacity, or may obtain other types of access, such as provisional access, temporary access, and the like.

The capacity may be provided using a number of different types of resources 118, 122, as illustrated in FIG. 1. For example, there may be different categories of resources, such as physical servers, virtual compute instances (e.g., virtual machines and/or containers), networking resources, and data storage resources. For a given category of resources, there may be different types of resources. For example, there may be a server of a first type that has a particular manufacturer, version, software, configuration, and capacity. There may be servers that are of essentially the same type but have different sizes or capacities, based on factors such as different amounts of storage, memory, or processing capacity. There may be different versions of the same type of server, as may correspond to servers of different ages or configurations, such as servers running different versions of an operating system or running different generations of processors. There may also be resources available in different regions 116, 120. Resources might be located in specific regions that are closer to various customers, in order to reduce latency as well as provide other benefits. A customer may then prefer in at least some embodiments to utilize resources that are in specific region, due to their proximity to the customer, a comfort level with the region in which the resources are located, or other such reasons.

In some instances a customer may only want an amount of capacity with certain minimum characteristics to have one or more tasks performed, and the resource manager can allocate resource capacity that is appropriate for those tasks. Other customers may want to have control over at least aspects of the capacity that is to be allocated to those customers. For example, a customer might want to obtain capacity of a certain type or size, with a certain number of instances, in a particular region, etc. Accordingly, the customer can use a customer device 102 to submit a request for the capacity, which can be directed to a capacity manager 110 or other such system, service, or component. The capacity manager 110 can look at data in a resource repository 114 to determine information such as a current amount of capacity, a current utilization of that capacity, and a promised or committed utilization of that capacity. In some embodiments at least some of this information can be obtained from the resource manager 108 instead of from a resource repository 114. If the capacity is available then the capacity manager can work with the resource manager to reserve the capacity needed for the request, and can submit a response to the client device 102 (or another appropriate destination) indicating that the capacity is available for use. In some embodiments the capacity will be made available automatically, while in other embodiments an authorized user or entity associated with the customer account will have to approve the reservation once the capacity is determined and at least provisionally reserved.

It might be the case, however, that a customer has a significant upcoming task that will require a significant amount of resource capacity, and would like to reserve the capacity ahead of time to ensure that the capacity is available to the customer when needed. In such a situation, the customer might utilize a customer device 102 to transmit a request for capacity availability to the resource provider environment 124, which will be directed to a capacity manager 110. The capacity manager in this embodiment can analyze information from the resource repository 114 or resource manager that may include, for example, information about current and future capacity, as well as the amount of that capacity that is currently allocated and capacity that is reserved for allocation in the future. The capacity manager 110 can then transmit a response indicating whether the requested capacity will be available for the indicated period of time.

As indicated, at least some amount of knowledge and manual intervention is required to determine whether there will be sufficient capacity available to support this request. Large customers may want to know if there will be sufficient capacity available to support future needs, such as for new product or system launches. The customer might plan to launch a big event, such as a new game or product promotion, which may require thousands of servers, or server instances, to back the launch. If additional capacity is needed, it can take weeks to generate additional supply but obtaining, installing, and configuring new server racks or other additional resources. The customer demand can also be extremely variable. While many customer requests come in at regular intervals to do regular types of work, there are often unexpected customer requests that may involve substantial requests for capacity, some of which may involve specific types or sizes of capacity in specific locations. It can be difficult to fulfill that capacity using resources already on the ground, at least without having to always run with large amounts of unused capacity). Further, providers do not like to turn down customer requests so it can be to their advantage to be able to satisfy as many requests as possible.

Approaches in accordance with various embodiments can provide automated techniques to determine a likelihood that sufficient capacity will be available, based upon factors such as current provisioning rates, or whether manual intervention may be required to obtain the necessary capacity. As mentioned, the capacity can include any appropriate type of electronic capacity for computing environments, as may include servers or server instances, storage space, queue processing capacity, or any other electronic resource that may consume a portion of the processing, network and storage capacity of the resource provider environment along at least certain dimensions. The capacity manager 110 in this example can utilize a prediction module 112, or other such system, service, or component, to predict or infer whether requested capacity will be available for a future period of time. The capacity manager 110 can then report this result back to the customer.

FIGS. 2A, 2B, and 2C illustrate example user interfaces that can be generated for display in accordance with various embodiments. In the example interface 200 illustrated in FIG. 2A, a customer can provide information about future capacity that the customer would like to obtain, or at least determine whether such capacity would be available. The customer may be able to supply information for various options 202, such as the resource type, quantity of resources (e.g., number and type of compute instances, number and size of storage volumes) needed, start date, and duration, among others. It should be understood that other collections of information can be gather in the same or other ways within the scope of various embodiments. Further, a customer or other user may be able to specify sets or ranges of values for at least some parameters, or provide rankings or preferences, etc.

A customer may also be able to request resources in a particular region of availability zone of the cloud provider network. A cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). In accordance with the present disclosure, a customer may request analysis of future capacity availability in one or more desired availability zones or regions.

As mentioned, in this example the customer can specify aspects of the server instances that the customer would like to utilize. This can include aspects such as a type of server (or server instance), as well as a size or capacity of the servers. For example, different types of instances may be allocated different types and quantities of underlying hardware resources including central processing units (CPUs), graphics processing units (GPUs), ephemeral memory (e.g., RAM), disk, and networking bandwidth. Other types of information can be captured in other embodiments as well, as may include configuration options, installed software, operating system, and the like. The customer in this example can also specify a region in which the customer would like to have the server instances allocated, such as a region in which a customer data center is located. The customer can specify other options as well, such as a start date and end date, as may be specified by a duration or other indicator of time. In some instances a customer may not know some of this information, or may not have a strong preference, and thus may fill in values that are of importance to the customer.

Upon the customer taking an action such as to select a submit option, a request can be generated that can be transmitted to the resource provider environment in this example, although it should be understood that the interface can be provided by a resource of the resource provider environment in some instances. The request can be directed to a capacity manager or other such system or service, for example, that can analyze the information for the request. As mentioned, the capacity manager can analyze information such as current and future capacity allocations for relevant types of resources, as well as the information for the requested capacity for the specified future period of time. In at least one embodiment, the capacity manager can make a binary decision as to whether the capacity will, or will likely, be available. This can include, for example, whether a likelihood of the capacity being available meets or exceeds a minimum confidence or probability threshold. In the example interface 240 of FIG. 2B, the interface provides notification 242 that the capacity should be available to satisfy the request, such that the customer can go ahead and request to reserve the capacity. In some embodiments the provider might guarantee the capacity, but in this example the provider only provides indication that the capacity should be available because there are variations in traffic and resource availability over time. Further, the indication is only valid for the point in time at which the determination was made, and any delay by the customer in selecting to reserve the capacity may be impacted by changes in availability or future commitments. There may be other factors that may impact the availability as well. If it is determined that the probability does not at least meet the minimum threshold, then the interface might indicate that there will likely not be sufficient capacity to fulfill the request. As discussed, however, capacity can change over time such that there may actually be sufficient capacity at the indicated time, such that the customer may be able to go ahead and request to reserve the capacity should it become available. In some embodiments, if there is sufficient time to provision new capacity before the requested date then a positive indication can be provided as long as it is possible to provision that new capacity by the specified date.

It might be the case that the capacity should be available, but there might be better options, or at least similar options, from which the customer can select. For example, the interface 280 illustrated in FIG. 2C provides notification 282 that the requested capacity should be available. As such, the customer can go ahead and request that option. The interface 280 also provides information about other options 284 that might be of interest to the customer. In this example, a first option is presented that would save the customer money by using an alternative instance type. This type might be an older version with similar characteristics, for example. A second option is presented that has a higher likelihood of availability. The second option uses a second instance type, which may provide similar performance, but has a higher likelihood or probability of the capacity being available at the specified time. As mentioned, a confidence threshold might be set to a value, such as 80%, that the probability must at least satisfy in order to be able to say that the capacity should be available. If the requested option has an 81% probability of availability, and the second option has a 99% probability of availability, then the user might want to select the second option even though it uses a different instance type to provide the capacity. In some embodiments, the customer can reserve the second option, but ask to be notified if a sufficient amount of the requested capacity becomes available such that the customer can switch to the requested type of capacity. There may be other types of options displayed as well for other reasons, such as options that might provide higher performance or improved security, among other such options.

Capacity checks may be important for various other reasons as well. For example, a customer might want to scale up unexpectedly due to a recent event. Some customers may prefer to utilize significant volumes of unusual hardware types, which the provider may not obtain in volume, particularly for smaller regions. The resource provider may then receive requests that are for genuinely problematic and/or interesting cases, as well as requests that may be relatively mundane and may cause significant noise in capacity determinations. Problematic requests may not all be readily be automated, since they often require extra actions such as special hardware orders to fulfill. More mundane requests can potentially be automated, however, which can save significant time for the provider and also provide most customers with much faster responses. Such systems can also act as assistants when dealing with requests, automating some of the initial data sifting that may need to be performed for each request. Such a system might also be able to take more factors into account than what can be performed by a human. A system in accordance with at least one embodiment can be the first port of call for enterprise customers, and other users or entities, to be able to have capacity checks performed.

In at least one embodiment, a capacity management system can work on a regional per pool basis. The system can take into account various factors, as may include current pool depth(s), general usage patterns and/or trends in a pool (e.g., growing vs shrinking usage), specific usage patterns of whale customers in the pool, and expected landing of new capacity and retirement of existing capacity. The system can also take into account various rebuild options into and out of the pool. Options for building into the pool can increase availability, while options for building out of the pool may increase the chance that capacity will be taken or otherwise allocated to satisfy other requests. The capacity management system can have the ability to correctly deal with pools that are significantly backed by heterogeneous and/or blended capacity. The system can also take into account information discussed above, such as the amount and type of capacity requested by the customer over a specified period.

Approaches in accordance with various embodiments can use machine learning to help predict or infer the availability of certain capacity for a future period of time. The model can be trained to accept any or all of the data discussed herein, as well as potentially other relevant data, to provide determinations and confidences as to the availability of capacity for certain requests. In various embodiments, any of a number of neural networks can be trained to accept input such as customer request values and system capacity information, and infer information about resource capacity at a future point or period in time.

In selecting or designing a model to be used, approaches in accordance with various embodiments utilize a machine learning model based upon logistic regression. Other embodiments can utilize other approaches, for example expert systems or rules-based algorithms. Expert system algorithms may make decisions by reasoning through bodies of knowledge, represented for example as if-then rules rather than through conventional procedural code. As used herein, a "prediction model" refers to both a machine-learned model and an expert system, and in some implementations to a combination of these approaches (e.g., where the output of a machine-learned model is vetted by an expert system in order to ensure that the prediction provided to the customer complies with known constraints). Logistic regression is used in statistics for binary classification problems, and thus can be appropriate in various embodiments as the availability of capacity can be formed as a binary classification problem, as the requested amount and type of capacity will either be available or not available. It should be noted, however, that the determination can come with a confidence score in at least some embodiments. The logistic regression model is built around a logistic function, often in the form of a sigmoid function. An example logistic regression equation is given by the ratio of the probability of the presence of a characteristic against the probability of the absence of that characteristic, such as is given by:

$$y = \frac{e^{(b_0+b_1*x)}}{1+e^{(b_0+b_1*x)}}$$

In this example function, y is the predicted output, $b_0$ is the bias, and $b_1$ is the coefficient for input value x. This logistic probability function can be used to model the probability of the class. While logistic regression is a linear in nature, the predictions are transformed using the logistic function above. The coefficients b of the logistic regression algorithm are determined during training on the training data, such as by using maximum-likelihood estimation. A properly trained model would utilize coefficients that result in the model predicting values of approximately 1 for the default class (such as the capacity being available) and approximately 0 for the other class (such as the capacity not being available). Logistic regression algorithms are used in industries such as the financial industry, where predicting the defaulting on a bond can be formed as a binary classification problem where the default may result from the organization running out of money due to any of a number of dynamic factors that may change over time. Linear regression models can use mean-squared error as their cost functions in at least some embodiments.

In at least one embodiment a machine learning model can be trained for each pool of capacity. A "pool" of capacity can refer to resource capacity that is of the same category, such as may include the same type of server instances of the same size and in the same region. Resources can be grouped into pools using these or other such similarity criteria. A given model can then be trained to estimate the probability of specific binary outcomes, in this case the success of being able to provide the requested capacity from the pool or the inability to provide that capacity. The system can then estimate the probability of a capacity default at the time the customer is looking for the capacity. If the probability is low, the customer can be notified that the provider does expect problems, barring a very unexpected event. If the probability is higher, the customer can be asked to work with a representative from the provider to work on possible solutions or alternatives. A capacity manager might be able to suggest alternatives as discussed above, such as where there is very similar capacity available or if there is capacity available in other nearby locations. A capacity manager could also run multiple scenarios using multiple trained models for different pools, especially when assisting a human, to suggest the easiest way to fulfill a specific customer request.

A capacity manager using a machine learning model can provide various benefits, such as much faster responses for many requests, all while taking more data into account. Such a system can also provide customers with a level of self-service using approaches discussed and suggested herein. Such a system can also assist with gathering data for people handling more complex requests. Such a system can also gather and provide information on customer interest with respect to capacity and resource types, which can help the provider make better decisions about future hardware expansions, upgrades, and deployments.

In some embodiments the capacity determinations will utilize data across all customers. In some embodiments a system may attempt to model customer usage over time in order to provide anticipated demand for a specific point in time, which can be provided as an input to the machine learning model. In some embodiments a system may attempt to model total capacity over time in order to attempt to predict the total amount of capacity in a given pool at a future point in time, taking into account trends in machines going offline, coming online, being shifted between pools, or being temporarily unavailable. Prediction models can also take into account seasonal or periodic variations, such as changes in demand due to a holiday season, summer break, weekend, etc.

In some embodiments the model might also take into account current allocations that may be modified. For example, another customer may have asked for capacity over a range of types, such that the customer's allocation can be moved to other capacity within that range to free up capacity for a current request. Further, another customer might be able to be upgraded to higher performing capacity to make room for a specific request. There may be some capacity that may be able to be reclaimed from certain customers. Various other potentially available capacity can be considered as well in various embodiments.

As mentioned, in some instances a customer may not provide a value or specify a preference for one or more options, such as region. In this case, the system could perform the analysis using models for different regions and then suggest the option with the highest probability of being available to satisfy the request. If probabilities are similar then the system may choose to recommend the option with the highest performance or lowest cost, etc. In some embodiments the selection of options may be automatic, while in others at least two options may be presented to the user as options, with at least some information about the differences. If historical information about the specific customer is available then that historical information can be considered in selecting options as well, as the type and amount of work that is likely to be performed based on historical data can be used to compare factors such as performance and pricing for different resource options.

Such a system can also provide forecasting for customers. For example, if a customer has an allocation over a current or future period the system can provide updated probabilities of availability over time. For example, if there will be additional capacity available the system might notify a customer that there is additional capacity available should the customer want to utilize that capacity. Similarly, if there is likely to be insufficient capacity, or at least a risk of insufficient capacity, at some point in the future, the system can notify the customer and suggest one or more options that might provide the customer with a lower probability of getting a capacity exception, or experiencing another such undesirable situation. The provider can also use such a forecasting tool to attempt to determine when to obtain additional capacity of specific types and sizes in specific regions, etc.

Figure 3:
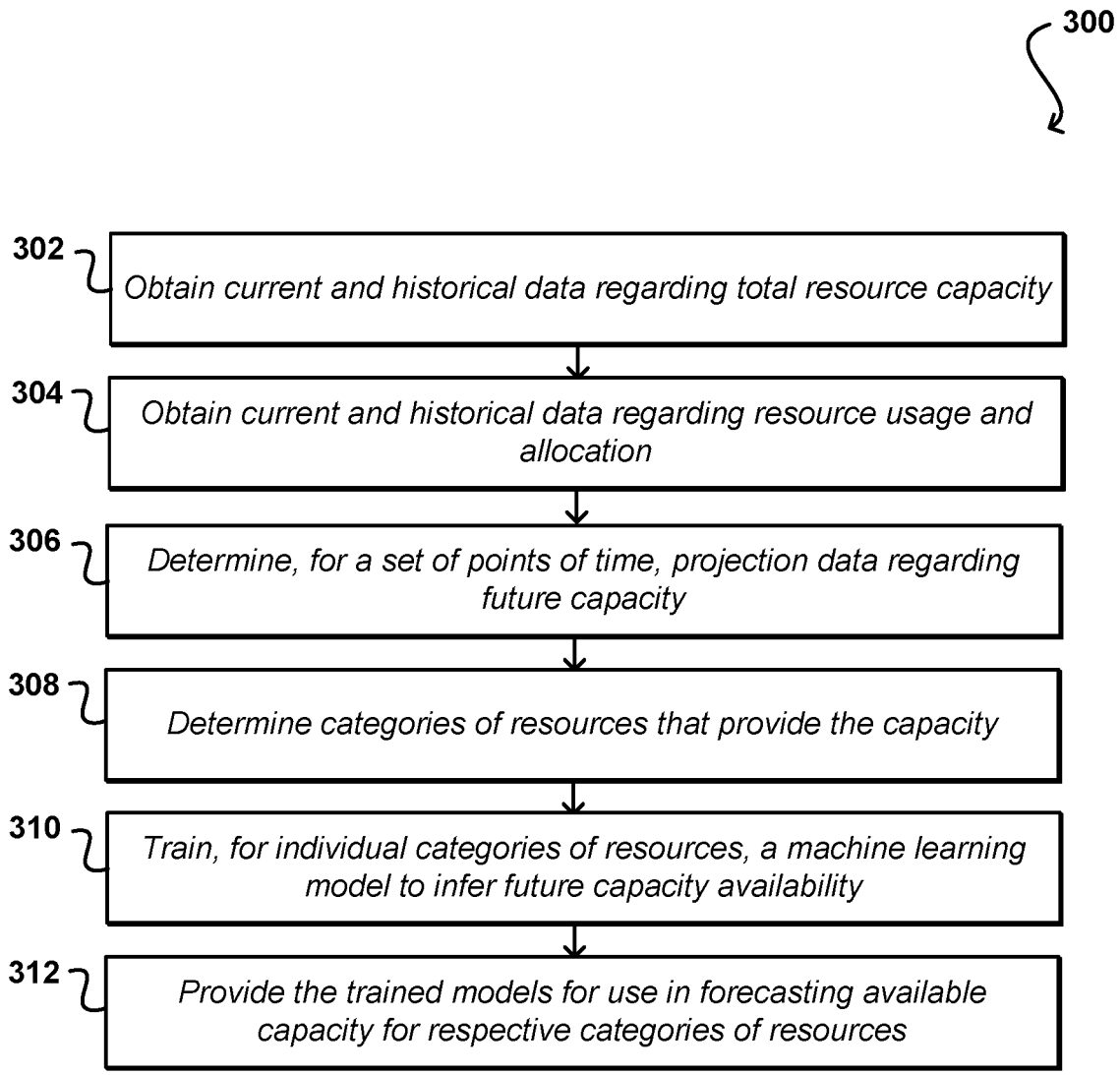
FIG. 3 illustrates an example training process that can be utilized in accordance with various embodiments.

FIG. 3 illustrates an example training process 300 that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, current and historical data is obtained 302 regarding total resource capacity for a resource provider. This can include the total capacity of any type that is available for allocation, regardless of whether or not that capacity was allocated. This amount can vary over time based upon factors such as additional physical resources being provisioned, physical resources being removed from service, maintenance, machine failures, and the like. In some embodiments, an entity such as a resource provider may not want to model all capacity, but may select specific categories of resources, which as mentioned herein can include resources of different types, sizes, locations, configurations, and the like. Current and historical data regarding resource usage and allocation can also be obtained 304, indicating which portions of the overall capacity were either allocated for a specific customer, application, or task, for example, or unallocated and available for other usage. As discussed, the portion of the capacity that is allocated or reserved at any point in time can vary as well based upon different numbers and types of requests being serviced, among other such factors. Other related data can be obtained for usage as well as discussed and suggested herein.

For at least some of this obtained data, projection data can be determined 306 for a set of points in time. This can include, for example, determining 308 categories of resources and manually projecting future available capacity for allocation at those points in time. In some embodiments, specific categories of resources may be used for projection, and in at least one embodiment the remaining capacity can be grouped into a "general" category that can be used to serve requests that do not require a specific category of capacity, or can be used in case of emergency to satisfy requests for specific types of capacity that are able to be serviced using other categories of capacity. It should be understood, however, that the process can be performed with minimal or no manual intervention in some embodiments. The generated projection data can be used, along with the relevant obtained data, as training data for a model, algorithm, or neural network in at least one embodiment. In this example, a machine learning model is trained 310 for each of a selected set of resource categories. As mentioned, the model may utilize logistic regression in at least some embodiments. In some embodiments multiple models can be trained for a category of resource for different periods of time or types of requests, among other such options. Once training has completed successfully, the trained models can be provided 312 for use in forecasting available capacity for the respective categories of resources.

Figure 4:
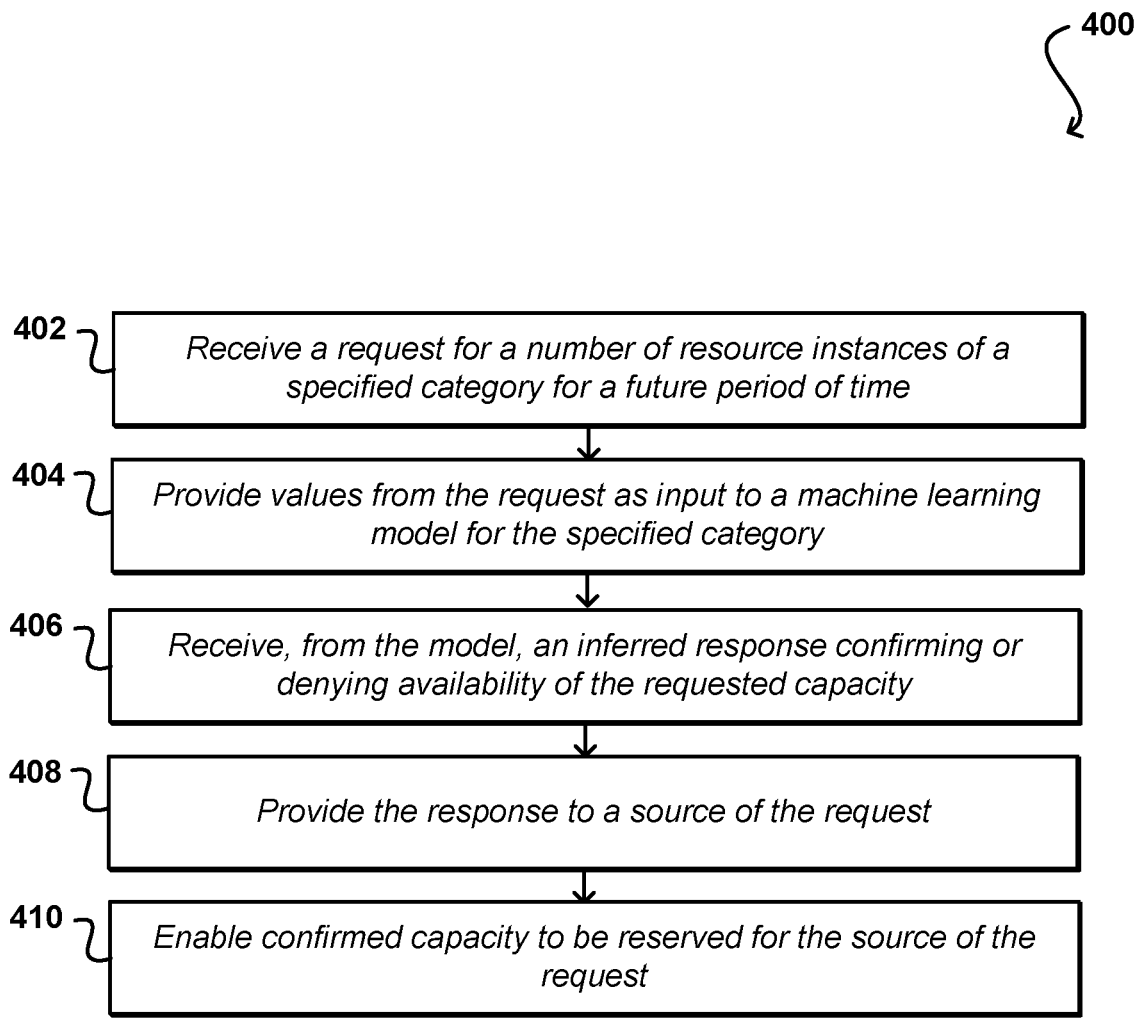
FIG. 4 illustrates a first example capacity determination process that can be utilized in accordance with various embodiments.

FIG. 4 illustrates an example process 400 for inferring the future availability of specified capacity in accordance with at least one embodiment. In this example, a request is received 402 for a number of resource instances (or other resources discussed and suggested herein) of a specified category for a future period of time. As discussed herein, in some embodiments the request does not need to fully specify a category but may provide at least an amount of capacity requested and any desired values, ranges, or characteristics for that capacity. Values from the request can be provided 404 as input to a trained logistic model (or neural network, etc.) for the specified category, such as a model trained using a process described with respect to FIG. 3. Other input may be provided as well as discussed and suggested herein, as may include historical data for a source of the request, among other such options. After processing, an inferred response can be received 406 from the model confirming or denying availability of the requested capacity. In this example where the model is a machine learning model that may utilize a logistic regression algorithm, the response will be a binary response confirming or denying, along with a confidence value in that inference in at least some embodiments. In other embodiments where other models or neural networks are used, for example, other types of output may be provided. The response can then be provided 408 to a source of the request, such that the source can be informed as to whether the requested capacity should be available. As mentioned, there are factors that can prevent the availability of the capacity from being guaranteed in some embodiments. If the availability was denied, another request for a different category, number, or period may be received. If availability is confirmed, the confirmed capacity can be enabled 410 to be reserved for the source of the request. In some embodiments the capacity can be reserved automatically if determined to be available. The reservation may only be held for a determined period of time if not confirmed by an authorized party associated with the source of the requests. Such reservation can help to ensure that confirmed capacity remains available between the communication of the confirmation and the actual reservation or confirmation by the source.

Figure 5:
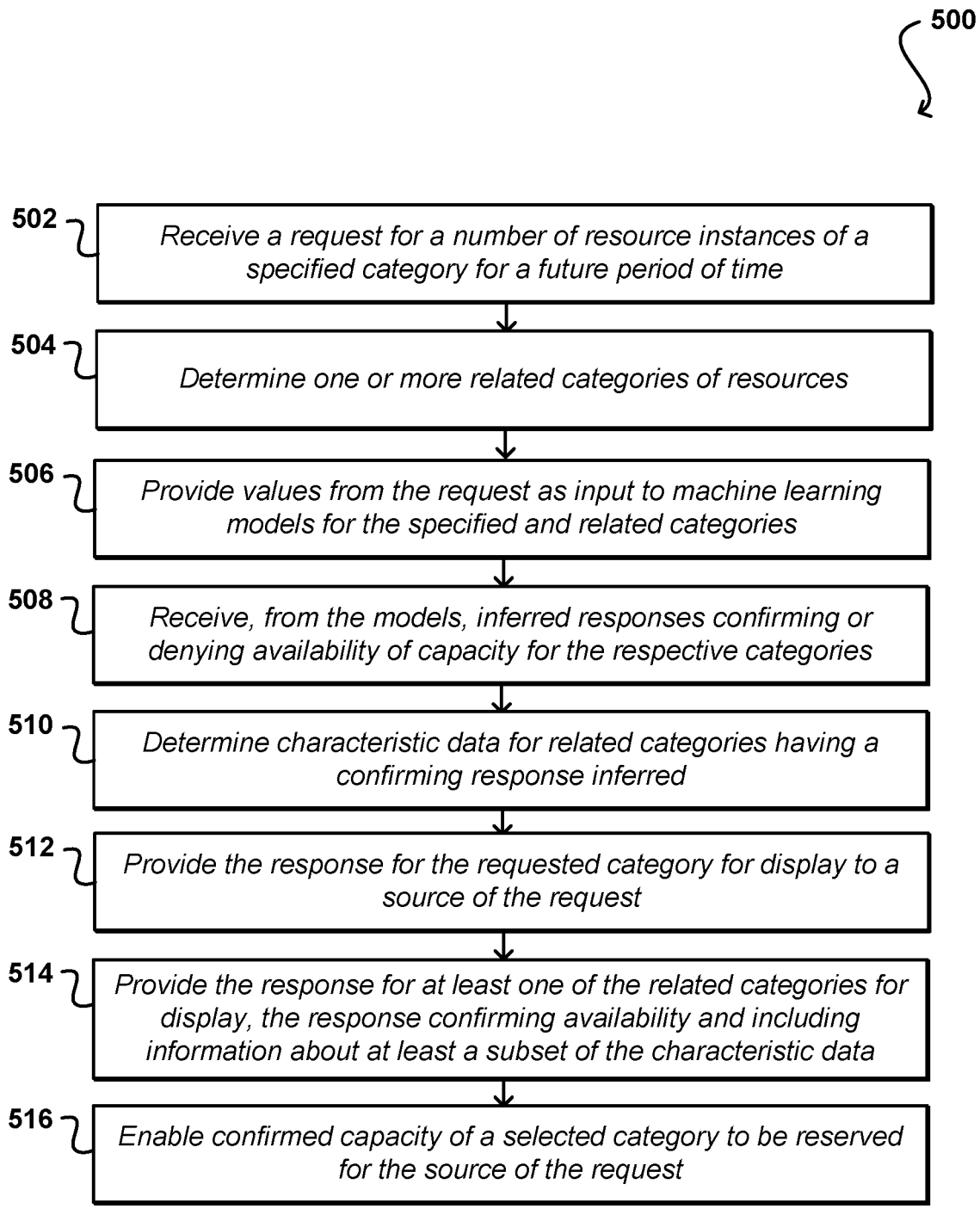
FIG. 5 illustrates a second example capacity determination process that can be utilized in accordance with various embodiments.

FIG. 5 illustrates another example process 500 for inferring the future availability of capacity in accordance with at least one embodiment. In this example, a request is received 502 for a number of resource instances (or other resources discussed and suggested herein) of a specified category for a future period of time. In this example, one or more related categories of resources can be determined 504, although in other embodiments analysis may be performed for all categories of resources. The related categories can be determined based upon a number of factors, such as similarity in size, location, configuration, and the like. In at least one embodiment, the related categories are determined using machine learning. For example, a neural network can be trained using data such as performance characteristics, historical customer selection, and the like. When a request for future capacity is receive, information for the request can be fed as input to the neural network, which can then infer one or more categories of resources that can satisfy the request with at least similar results. Values from the request can be provided 506 as input to the trained logistic models (or neural networks, etc.) for the specified category as well as at least some of the related categories. Other input may be provided as well as discussed and suggested herein. After processing, an inferred response can be received 508 from the models confirming or denying availability of the requested capacity for each of the respective categories. As mentioned, the response from each model can be a binary response confirming or denying, along with a confidence value in that inference in at least some embodiments. For at least some categories that received a confirmatory response, characteristic data can be determined 510. The characteristic data can include, for example, performance data, resource age, cost, and the like. The response for the requested category can be provided 512 for display to a source of the request, such that the source can be informed as to whether the requested capacity should be available. The response for one or more of the related categories that received a confirmatory response can also be provided 514 as an option or alternative recommendation, where the response can include information about at least some of the characteristic data. The categories selected for display can be selected based upon ranking of confidence scores in some embodiments, or based in part upon the characteristic data. For example, an alternative might be selected based on a higher anticipated performance than the requested capacity, or a lower cost of the category of capacity. In some embodiments at least one alternative might be selected based at least in part upon the confidence or probability of availability being higher than for the requested resource category. It should be understood that some embodiments might provide a probability of unavailability instead of a probability of availability. Any of the confirmed capacity can then be enabled 516 to be reserved for the source of the request. In some embodiments the capacity can be reserved automatically if determined to be available as discussed above.

Figure 6:
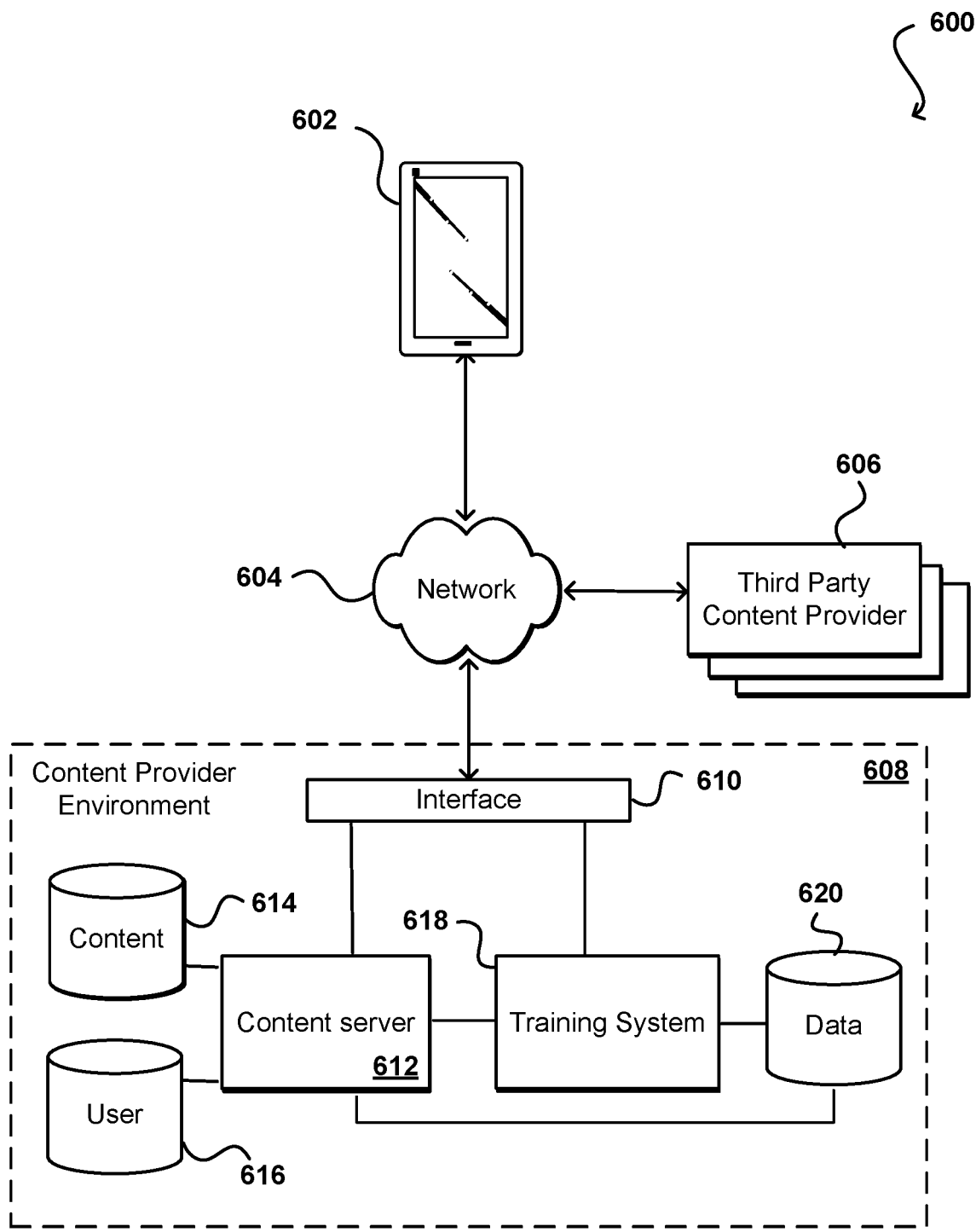
FIG. 6 illustrates a system that can be used to train a neural network in accordance with various embodiments.

FIG. 6 illustrates an example environment 600 that can be used to implement aspects in accordance with various embodiments. As mentioned elsewhere herein, various network training and data manipulation tasks can be performed on a client device or by a network service, among other such options. In FIG. 6, a client computing device 602 can submit a request for content across at least one network 604 to be received by a content provider environment 608. In some embodiments, the content provider environment can be a resource provider environment, where results of usage of the capacity returned to a user are considered content. As mentioned, in at least some embodiments the request can include input for which a user of the client computing device 602 wants to obtain classification or identification information, for example. The network(s) can include any appropriate network, such as the Internet, a local area network (LAN), a cellular network, an Ethernet, or other such wired and/or wireless network. The content provider environment 608 can include any appropriate resources for providing content from a resource provider, as may include various servers, data stores, and other such components known or used for providing content from across a network (or from the "cloud").

In this example, a call received to the content provider environment 608 can be received by an interface layer 610 of the environment. As known for network environments, the interface layer can include components such as interfaces (e.g., APIs), load balancers, request and/or data routers, and the like. If the request is a request for content, such as for content related to a query image, information for the request can be directed to one or more content servers 612, which can obtain the relevant content from a content data store 614 or other such repository to be sent back across the network(s) to the computing device. In some embodiments, information for the request might be compared against user data in a user data store 616 or other such location to determine, for example, whether the user has access rights to that content. In some cases, a call or request received to the content provider environment 608 might be from another entity, such as a third party content provider 606.

The interface layer can determine the type of call or request and cause information to be forwarded to the appropriate component or sub-system. For example, training data can be stored to a data store 620 for use in training a neural network by a training system or service 618, with the resulting training sets being stored to the same or a different data store 620, or the content repository 614. When a request for content is received, data for the request can be processed using a trained neural network. Once an inference is made, the inference can be forwarded to the content server 612 which can pull the corresponding content from an appropriate data store 614 or 620 and returned to the client computing device 602.

Figure 7:
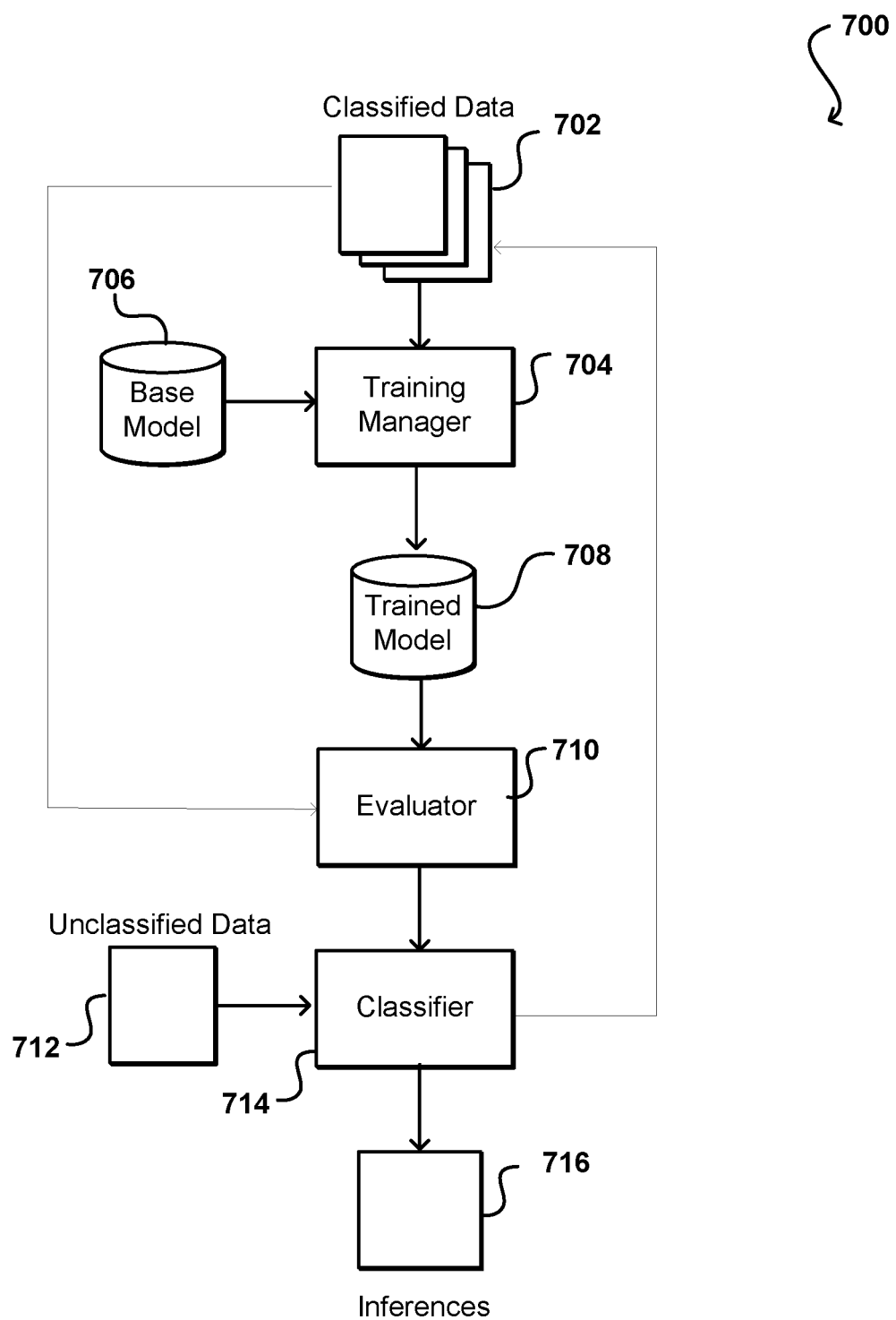
FIG. 7 illustrates components of an example training pipeline that can be utilized in accordance with various embodiments.

FIG. 7 illustrates an example system 700 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 702 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 702 in this example is provided as training input to a training manager 704. The training manager 704 can be a system or service that includes hardware and software, such as one or more computing devices executing a training application, for training the statistical model. In this example, the training manager 704 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 704 can select a base model, or other untrained model, from an appropriate repository 706 and utilize the classified data 702 to train the model, generating a trained model 708 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A machine learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models. Other approaches can be used as well as discussed herein, as may involve expert systems or other rules-based approaches that may at least partially utilize machine learning in inferring future capacity. An expert system in one embodiment is a rules-based algorithm that makes decisions using artificial intelligence or machine learning-based techniques.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 708 can be provided for use by a classifier 714 in classifying unclassified data 712. In many embodiments, however, the trained model 708 will first be passed to an evaluator 710, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known and use this assessment as a proxy for predictive accuracy on future data.

In some embodiments, a model is evaluated using a subset of the classified data 702 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 708 and the evaluator 710 can determine the accuracy of the model by comparing the ground truth data against the corresponding output (or predictions/observations) of the model. The evaluator 710 in some embodiments can provide a summary or performance metric indicating how well the predicted and true values match. If the trained model does not satisfy at least a minimum performance criterion, or other such accuracy threshold, then the training manager 704 can be instructed to perform further training, or in some instances try training a new or different model, among other such options. If the trained model 708 satisfies the relevant criteria, then the trained model can be provided for use by the classifier 714.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources but has failed to generalize the patterns in the data. Overfitting often occurs when the training data includes all of the data used in the evaluation. A model that has been over fit may perform well during evaluation but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 700 of FIG. 7, the trained model 710 after evaluation is provided, or made available, to a classifier 714 that is able to use the trained model to process unclassified data. This may include, for example, data received from users or third parties that are not classified, such as query images that are looking for information about what is represented in those images. The unclassified data can be processed by the classifier using the trained model, and the results 716 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 708 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances, the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 8:
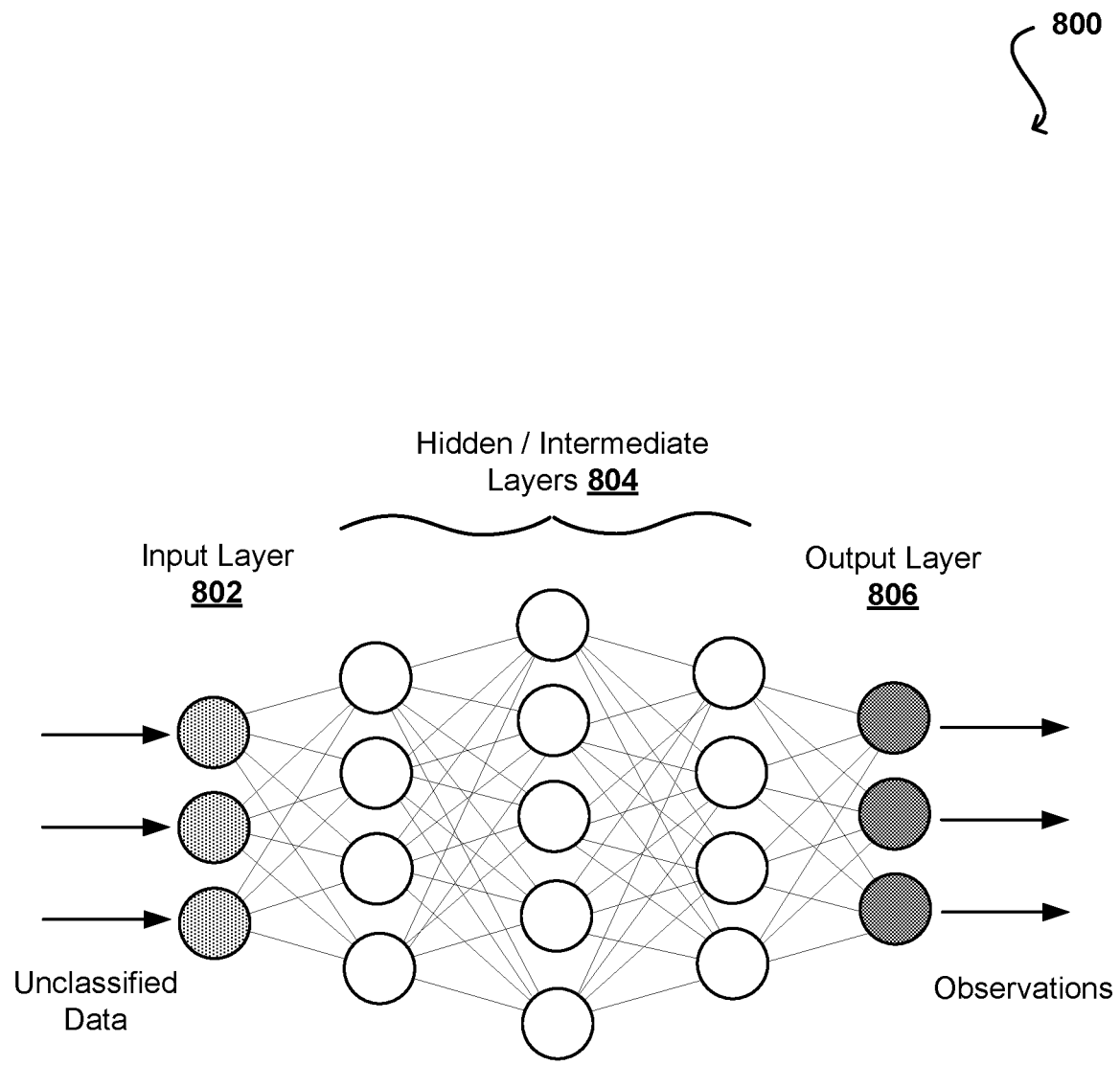
FIG. 8 illustrates an example neural network that can be utilized in accordance with various embodiments.

FIG. 8 illustrates an example statistical model 800 that can be utilized in accordance with various embodiments. In this example the statistical model is an artificial neural network (ANN) that includes a multiple layers of nodes, including an input layer 802, an output layer 806, and multiple layers 804 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 9:
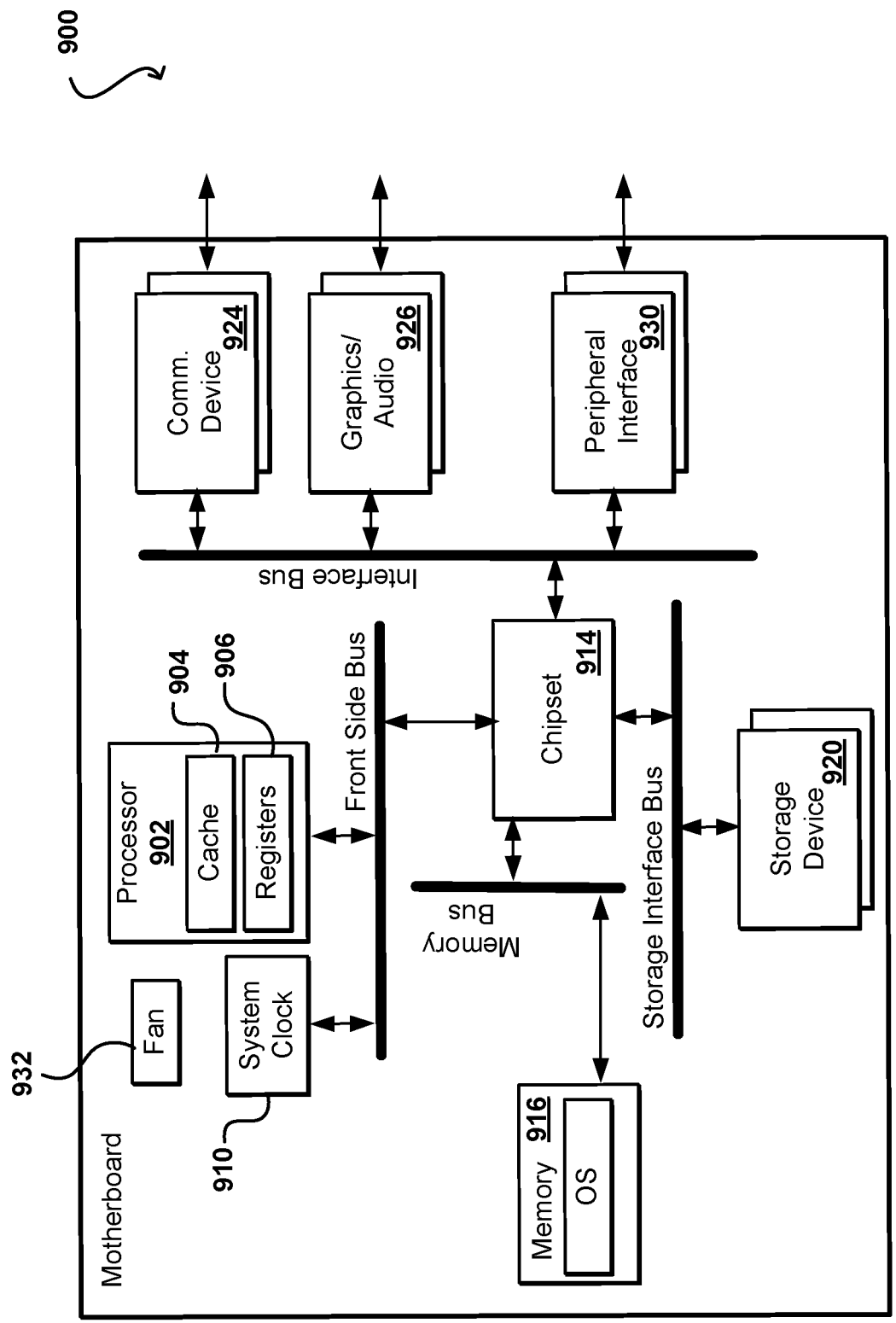
FIG. 9 illustrates components of an example computing device that can be used to implement aspects of various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 9 illustrates components of an example computing device 900 that can be utilized in accordance with various embodiments. As known for computing devices, the computer will have one or more processors 902, such as central processing units (CPUs), graphics processing units (GPUs), and the like, that are electronically and/or communicatively coupled with various components using various buses, traces, and other such mechanisms. A processor 902 can include memory registers 906 and cache memory 904 for holding instructions, data, and the like. In this example, a chipset 914, which can include a northbridge and southbridge in some embodiments, can work with the various system buses to connect the processor 902 to components such as system memory 916, in the form or physical RAM or ROM, which can include the code for the operating system as well as various other instructions and data utilized for operation of the computing device. The computing device can also contain, or communicate with, one or more storage devices 920, such as hard drives, flash drives, optical storage, and the like, for persisting data and instructions similar, or in addition to, those stored in the processor and memory. The processor 902 can also communicate with various other components via the chipset 914 and an interface bus (or graphics bus, etc.), where those components can include communications devices 924 such as cellular modems or network cards, media components 926, such as graphics cards and audio components, and peripheral interfaces 930 for connecting peripheral devices, such as printers, keyboards, and the like. At least one cooling fan 932 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 902 can obtain data from physical memory 916, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 904 in at least some embodiments. The computing device 900 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 930, a communication device 924, a graphics or audio card 926, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 902 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a DATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 10:
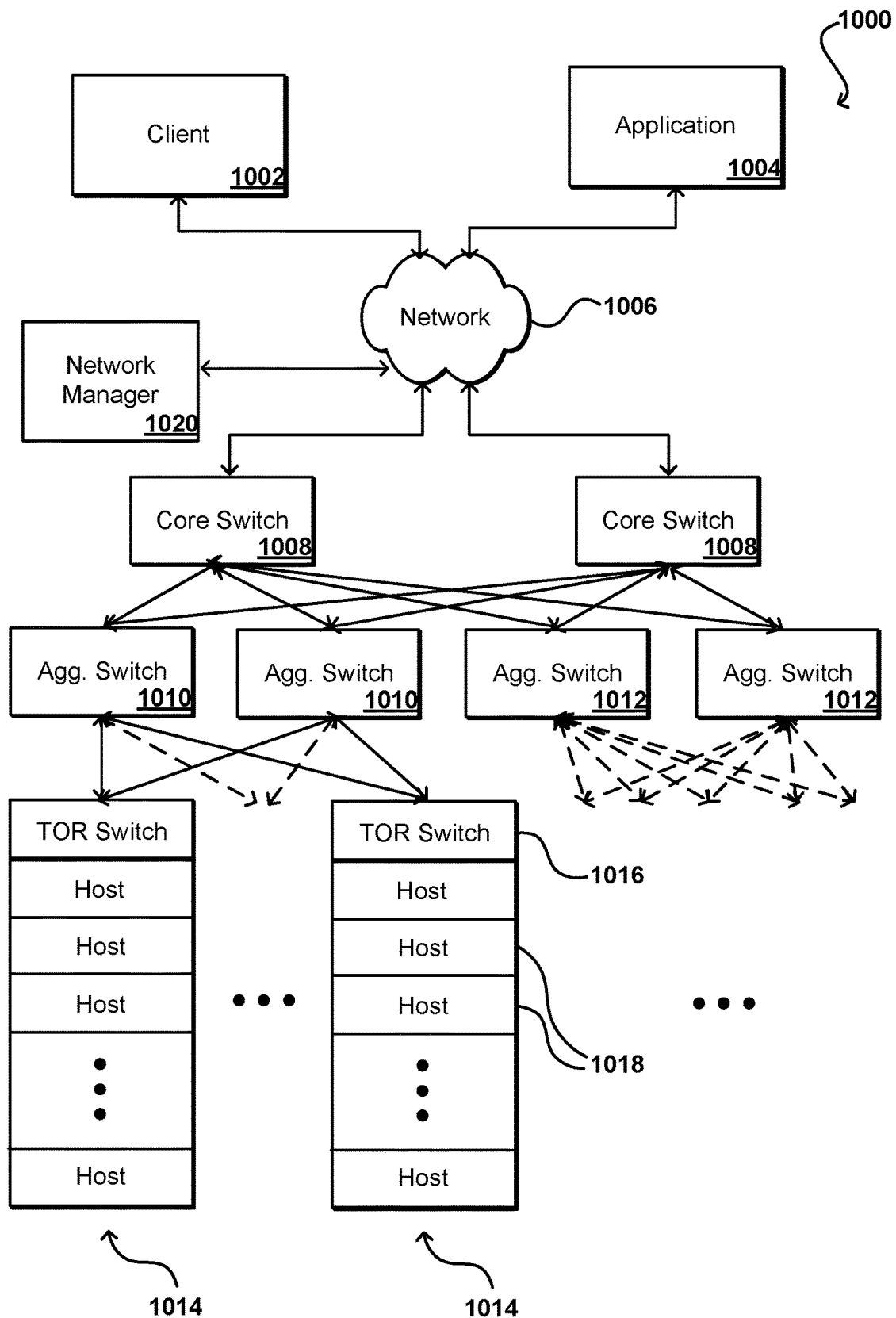
FIG. 10 illustrates components of an example environment in which aspects of the various embodiments can be implemented.

FIG. 10 illustrates an example network configuration 1000 that can be used to route communications between specific host machines or other such devices in such an environment. This example shows a typical design that can be used for a data center, wherein a source such as a client device 1002 or application 1004 is able to send requests across at least one network 1006, such as the Internet or a cellular network, to be received by one or more components of the data center. Properties of various components of the network, such as provisioned instances, etc., can be managed using at least one management system, component, or service 1020. In this example, the requests are received over the network to one of a plurality of core switches 1008, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 1008 is able to communicate with each of a plurality of aggregation switches 1010, 1012, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 1010, 1012 is linked to a plurality of physical racks 1014, each of which typically contains a top of rack (TOR) or "access" switch 1016 and a plurality of physical host machines 1018, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 1006. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 11:
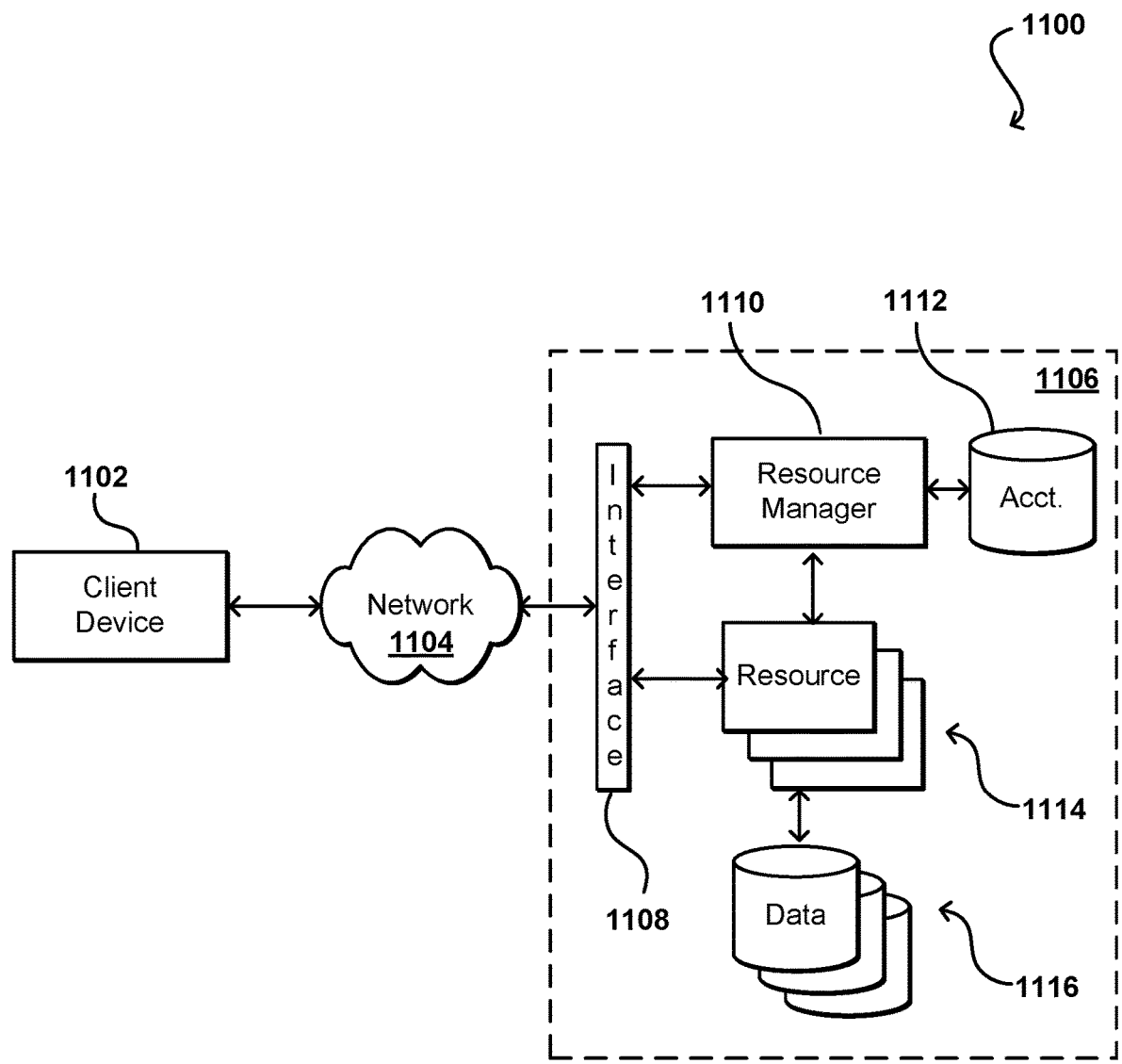
FIG. 11 illustrates components of another example environment that can be used to implement aspects of the various embodiments.

As mentioned, such a configuration can be used in some embodiments to provide resource capacity for one or more users or customers as part of a shared resource environment. FIG. 11 illustrates an example of one such environment 1100 in which aspects of the various embodiments can be implemented. In this example a user is able to utilize a client device 1102 to submit requests across at least one network 1104 to a multi-tenant resource provider environment 1106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 1104 can include any appropriate network, including an intranet, the Internet, a cellular network, a local area network (LAN), or any other such network or combination, and communication over the network can be enabled via wired and/or wireless connections. The resource provider environment 1106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 1114 of one or more types. These types can include, for example, application servers operable to process instructions provided by a user or database servers operable to process data stored in one or more data stores 1116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 1114 can submit a request that is received to an interface layer 1108 of the provider environment 1106. The interface layer can include application programming interfaces (APIs) or other exposed interfaces enabling a user to submit requests to the provider environment. The interface layer 1108 in this example can also include other components as well, such as at least one Web server, routing components, load balancers, and the like. When a request to provision a resource is received to the interface layer 1108, information for the request can be directed to a resource manager 1110 or other such system, service, or component configured to manage user accounts and information, resource provisioning and usage, and other such aspects. A resource manager 1110 receiving the request can perform tasks such as to authenticate an identity of the user submitting the request, as well as to determine whether that user has an existing account with the resource provider, where the account data may be stored in at least one data store 1112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 1102 to communicate with an allocated resource without having to communicate with the resource manager 1110, at least until such time as a relevant aspect of the user account changes, the user is no longer granted access to the resource, or another such aspect changes.

The resource manager 1110 (or another such system or service) in this example can also function as a virtual layer of hardware and software components that handles control functions in addition to management actions, as may include provisioning, scaling, replication, etc. The resource manager can utilize dedicated APIs in the interface layer 1108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 1108 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for allocation of capacity of a number of resources of a specified category over a future period of time;
   determining a set of related categories of resources with respect to the specified category;
   providing, as input, information for the request to a set of logistic regression models, the logistic regression models trained for the specified category or one of the related categories;
   receiving, from the set of logistic regression models, determinations as to whether capacity to satisfy the request will be available over the future period of time for the specified category and the related categories of resources;
   providing, in response to the request, information indicating whether the capacity will be available for the specified category, and information for at least one of the related categories that is determined to have the capacity to satisfy the request over the future period of time; and
   reserving selected capacity, from among the specified category or the at least one related category, for use by an entity associated with the request.

2. The computer-implemented method of claim 1, further comprising:
determining a set of categories of resources, the categories being determined based at least in part upon a type, size, or location of the resources.

3. The computer-implemented method of claim 1, further comprising:
selecting the at least one related category to provide based at least in part upon a first confidence score, for a capacity confirmation for the at least one related category, being higher than a second confidence score for a capacity confirmation for the specified category.

4. The computer-implemented method of claim 1, further comprising:
selecting the at least one related category based at least in part upon a characteristic of the at least one related category being beneficial with respect to a corresponding characteristic of the specified category.

5. The computer-implemented method of claim 1, further comprising:
receiving, with the determinations as to whether capacity to satisfy the request will be available, confidence scores for the specified category and the related categories;
ranking the specified category and the related categories using the confidence scores; and
selecting a highest ranked subset of the ranked categories as the at least one related category.

6. A computer-implemented method, comprising:
receiving a request specifying resources of a specified category and a future period of time;
providing, as input, information for the request to a plurality of prediction models;
receiving, from the plurality of prediction models, a determination as to whether capacity to satisfy the request will be available over the future period of time for the specified category of resources and for one or more additional categories of resources; and
providing, in response to the request, information indicating whether the capacity will be available for the specified category and for the one or more additional categories of resources over the future period of time.

7. The computer-implemented method of claim 6, further comprising:
enabling capacity from the specified category to be reserved for use by an entity associated with the request.

8. The computer-implemented method of claim 6, further comprising:
determining a set of related categories of resources with respect to the specified category, the set of related categories of resources forming at least a portion of the one or more additional categories of resources.

9. The computer-implemented method of claim 8, further comprising:
selecting at least one related category based at least in part upon a characteristic of the at least one related category being beneficial with respect to a corresponding characteristic of the specified category.

10. The computer-implemented method of claim 9, wherein the characteristic relates to a performance, cost, age, version, or configuration of resources.

11. The computer-implemented method of claim 8, further comprising:
selecting at least one related category based at least in part upon a first confidence score, for a capacity confirmation for the at least one related category, being higher than a second confidence score for a capacity confirmation for the specified category.

12. The computer-implemented method of claim 8, further comprising:
receiving confidence scores for the specified category and the set of related categories;
ranking the specified category and the set of related categories using the confidence scores; and
selecting a highest ranked subset of the ranked categories as at least one related category to provide.

13. The computer-implemented method of claim 6, further comprising:
obtaining training data including current and historic capacity data, the training data further including capacity projections for future points in time; and
training the prediction models for a plurality of resource categories using the training data.

14. The computer-implemented method of claim 13, further comprising:
determining a set of resource categories based at least in part upon a type, size, or location of the resource.

15. The computer-implemented method of claim 6, wherein the resources include at least one of physical servers, virtual machine instances, storage devices, network capacity, or processing units.

16. A system, comprising:
a processor; and
memory including instructions that, when executed by the processor, cause the system to:
receive a request specifying resources of a specified category and a future period of time;
provide, as input, information for the request to a plurality of prediction models;
receive, from the plurality of prediction models, a determination as to whether capacity to satisfy the request will be available over the future period of time for the specified category of resources and for one or more additional categories of resources; and
provide, in response to the request, information indicating whether the capacity will be available for the specified category and for the one or more additional categories of resources over the future period of time.

17. The system of claim 16, wherein the instructions when executed further cause the system to:
reserve capacity from the specified category for use by an entity associated with the request.

18. The system of claim 16, wherein the instructions when executed further cause the system to:
determine a set of related categories of resources with respect to the specified category, the set of related categories of resources forming at least a portion of the one or more additional categories of resources.

19. The system of claim 18, wherein the instructions when executed further cause the system to:
select at least one related category based at least in part upon a characteristic of the at least one related category being beneficial with respect to a corresponding characteristic of the specified category.

20. The system of claim 18, wherein the instructions when executed further cause the system to:
select at least one related category based at least in part upon a first confidence score, for a capacity confirmation for the at least one related category, being higher than a second confidence score for a capacity confirmation for the specified category.

\* \* \* \* \*